United States Patent
Nam et al.

(10) Patent No.: US 7,549,796 B2
(45) Date of Patent: Jun. 23, 2009

(54) DIGITAL TEMPERATURE DETECTION CIRCUIT ADAPTED FOR USE WITH SEMICONDUCTOR DEVICE

(75) Inventors: Jeong Sik Nam, Seoul (KR); Byung Kwan Chun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 94 days.

(21) Appl. No.: 11/654,639

(22) Filed: Jan. 18, 2007

(65) Prior Publication Data
US 2007/0177652 A1 Aug. 2, 2007

(30) Foreign Application Priority Data
Jan. 20, 2006 (KR) .............. 10-2006-0006186

(51) Int. Cl.
G01K 7/00 (2006.01)
G01K 15/00 (2006.01)
H01K 3/00 (2006.01)

(52) U.S. Cl. .............. 374/170; 374/1; 374/171; 327/512; 327/513; 702/130

(58) Field of Classification Search ........... 374/1, 374/170, 171, 172, 173; 327/512, 513, 525; 702/130
See application file for complete search history.

(56) References Cited

U.S. PATENT DOCUMENTS

| | | | |
|---|---|---|---|
| 6,169,442 B1 * | 1/2001 | Meehan et al. ............. 327/513 |
| 7,309,157 B1 * | 12/2007 | Aslan et al. ............. 374/178 |
| 7,331,708 B2 * | 2/2008 | Blom et al. ............. 374/171 |
| 2006/0161373 A1 * | 7/2006 | Mangrulkar et al. ....... 702/130 |
| 2006/0221741 A1 * | 10/2006 | Jain et al. ............. 365/211 |
| 2007/0110123 A1 * | 5/2007 | Nam et al. ............. 374/170 |
| 2007/0126471 A1 * | 6/2007 | Jeong ............. 326/30 |
| 2007/0146056 A1 * | 6/2007 | McClure et al. ............. 327/537 |
| 2008/0043810 A1 * | 2/2008 | Vogt et al. ............. 374/170 |
| 2008/0091378 A1 * | 4/2008 | Jeong et al. ............. 702/130 |
| 2008/0095213 A1 * | 4/2008 | Lin et al. ............. 374/170 |

FOREIGN PATENT DOCUMENTS

| | | |
|---|---|---|
| JP | 2000055742 A | 2/2000 |
| KR | 1020040087152 A | 10/2004 |
| KR | 1020050033123 A | 4/2005 |

* cited by examiner

*Primary Examiner*—Lisa M Caputo
*Assistant Examiner*—Mirellys Jagan
(74) *Attorney, Agent, or Firm*—Volentine & Whitt, PLLC (57) ABSTRACT

A digital temperature detection circuit adapted for use with a semiconductor device is disclosed. The digital temperature detection circuit comprises a digital temperature generation unit adapted to detect an internal temperature of the semiconductor device, convert the internal temperature into perception data in accordance with a perception data code, and output the perception data. The digital temperature detection circuit further comprises an offset shift unit adapted to shift the perception data in accordance with offset data to thereby generate standard data; and, an offset generation unit adapted to generate the offset data, wherein the offset generation unit is controlled from outside of the digital temperature detection circuit.

18 Claims, 6 Drawing Sheets

DIGITAL TEMPERATURE DETECTION CIRCUIT ADAPTED FOR USE WITH SEMICONDUCTOR DEVICE

BACKGROUND OF THE INVENTION

1. Field of the Invention

Embodiments of the invention relate generally to a digital temperature detection circuit adapted for use with a semiconductor device. In particular, embodiments of the invention relate to a digital temperature detection circuit that detects an internal temperature of a semiconductor device in a digital form.

This application claims priority to Korean Patent Application No. 2006-6186, filed on Jan. 20, 2006, the subject matter of which is hereby incorporated by reference in its entirety.

2. Description of the Related Art

The internal temperature of a semiconductor device must be detected for various purposes. For example, in Dynamic Random Access Memory (DRAM), a refresh operation is required in order to accurately preserve data stored in the DRAM. The length (or period) of the refresh cycle is commonly controlled in relation to the internal temperature of the DRAM. For example, when the internal temperature of the DRAM is relatively high, current leakage from memory cells in the DRAM increases. Thus, when the internal temperature of the DRAM is relatively high, errors due to memory cell leakage can be substantially prevented by reducing the period of the refresh cycle in the DRAM. In contrast, when the internal temperature of the DRAM is relatively low, current leakage from DRAM memory cells decreases. Thus, when the internal temperature of the DRAM is relatively low, data can be stored accurately in the DRAM even when the refresh cycle has a relatively long period. Since a DRAM consumes less power when operated with a longer refresh cycle period, the accurate detection of the internal temperature of the DRAM is an important operating parameter.

Thus, contemporary semiconductor devices typically include a temperature detection circuit adapted to detect the internal temperature of the semiconductor device. The design and/or configuration of a temperature detection circuit requires the definition (e.g., pre-set) of a critical temperature. An actual internal temperature for a semiconductor device may then be compared with the pre-set critical temperature. This comparison allows the generation of a temperature detection signal. The temperature detection signal is commonly expressed as a digital value. In a so-called "digital temperature detection circuit," $2^n$ critical temperature values are set and output data values, each comprising "n" bits of digital data, are generated by the digital temperature detection circuit. When using a digital temperature detection circuit, the internal temperature of a semiconductor device is detected in accordance with an output data value generated by the digital temperature detection circuit.

Additionally, due to variances in process conditions associated with the fabrication of semiconductor devices, there may be definitional gaps (e.g., a lack of measurement granularity) between the critical temperatures identifiable by conventional digital temperature detection circuits. As a result, an actual temperature measured for a particular semiconductor device may be errantly expressed. Therefore, there may be considerable differences between actual internal temperatures and "measured" internal temperature indications provided by a conventional digital temperature measuring circuit. This is particularly disadvantageous when the measured internal temperatures also lack accurate, comparative critical temperature references.

Furthermore, in a conventional digital temperature detection circuit, once the output data corresponding to the detected internal temperature is generated, it is very difficult to vary corresponding offset data commonly used to adjust the output data. Therefore, there are limited applications for the conventional digital temperature detection circuit, and the conventional digital temperature detection circuit is difficult use even in those applications in which it can be used.

SUMMARY OF THE INVENTION

Embodiments of the invention provide a digital temperature detection circuit for a semiconductor device in which offset data may be readily varied.

In one embodiment, the invention provides a digital temperature detection circuit adapted for use with a semiconductor device. The digital temperature detection circuit comprises a digital temperature generation unit adapted to detect an internal temperature of the semiconductor device, convert the internal temperature into perception data in accordance with a perception data code, and output the perception data. The digital temperature detection circuit further comprises an offset shift unit adapted to shift the perception data in accordance with offset data to thereby generate standard data; and, an offset generation unit adapted to generate the offset data, wherein the offset generation unit is externally controlled.

In another embodiment, the invention provides a digital temperature detection circuit adapted for use with a semiconductor device, the digital temperature detection circuit comprising a digital temperature generation unit adapted to detect an internal temperature of the semiconductor device, convert the internal temperature into perception data in accordance with a perception data code, and output the perception data. The digital temperature detection circuit further comprises; an offset shift unit adapted to shift the perception data in accordance with offset data and fuse data to thereby generate standard data; an offset generation unit adapted to generate the offset data, wherein the offset generation unit is externally controlled, and an offset fuse set comprising at least one component offset fuse and adapted to generate the fuse data in accordance with whether the at least one component offset fuse has blown.

BRIEF DESCRIPTION OF THE DRAWINGS

Embodiments of the invention will be described hereinafter with reference to the accompanying drawings, in which like reference symbols indicate like or similar elements. In the drawings.

DESCRIPTION OF EMBODIMENTS

As used herein, a "data code" is defined as a set of data values, wherein the data values correspond to input values. For a single input value, two different data codes may respectively have two different data values that correspond to that input value. Furthermore, when input values that vary by a first amount are input into different data codes, e.g., two different data codes, the variation in the data values that correspond to the input values in the first data code may be different than the variation in the data values that correspond to the input values in the second data code.

In the illustrated embodiments, a single input value corresponding to an internal temperature will typically correspond to different data values in different data codes. Furthermore, when input values corresponding to internal temperatures vary by a first amount and are input into different data codes, e.g., two different data codes, the variation in the data values that correspond to the input values in the first data code will be different than the variation in the data values that correspond to the input values in the second data code.

Additionally, as used herein, the term "data" may refer to a single bit, or more commonly to a group of bits (e.g., 8 bits). Also, the term "data value" refers to the specific combination of logic states (e.g., 1 or 0) formed by the data bits. A data value may be digitally represented in binary or decimal form.

Furthermore, as used herein, a data code and data that corresponds to that data code generally have corresponding names. For example, standard data comprises a data value that corresponds to a first input value in accordance with a standard data code, and detection data comprises a data value that corresponds to a second input value in accordance with a detection data code. Also, the first and second input values mentioned above correspond to internal temperatures of a semiconductor device.

An embodiment of the invention will now be described with reference to the accompanying drawings.

Figure 1:
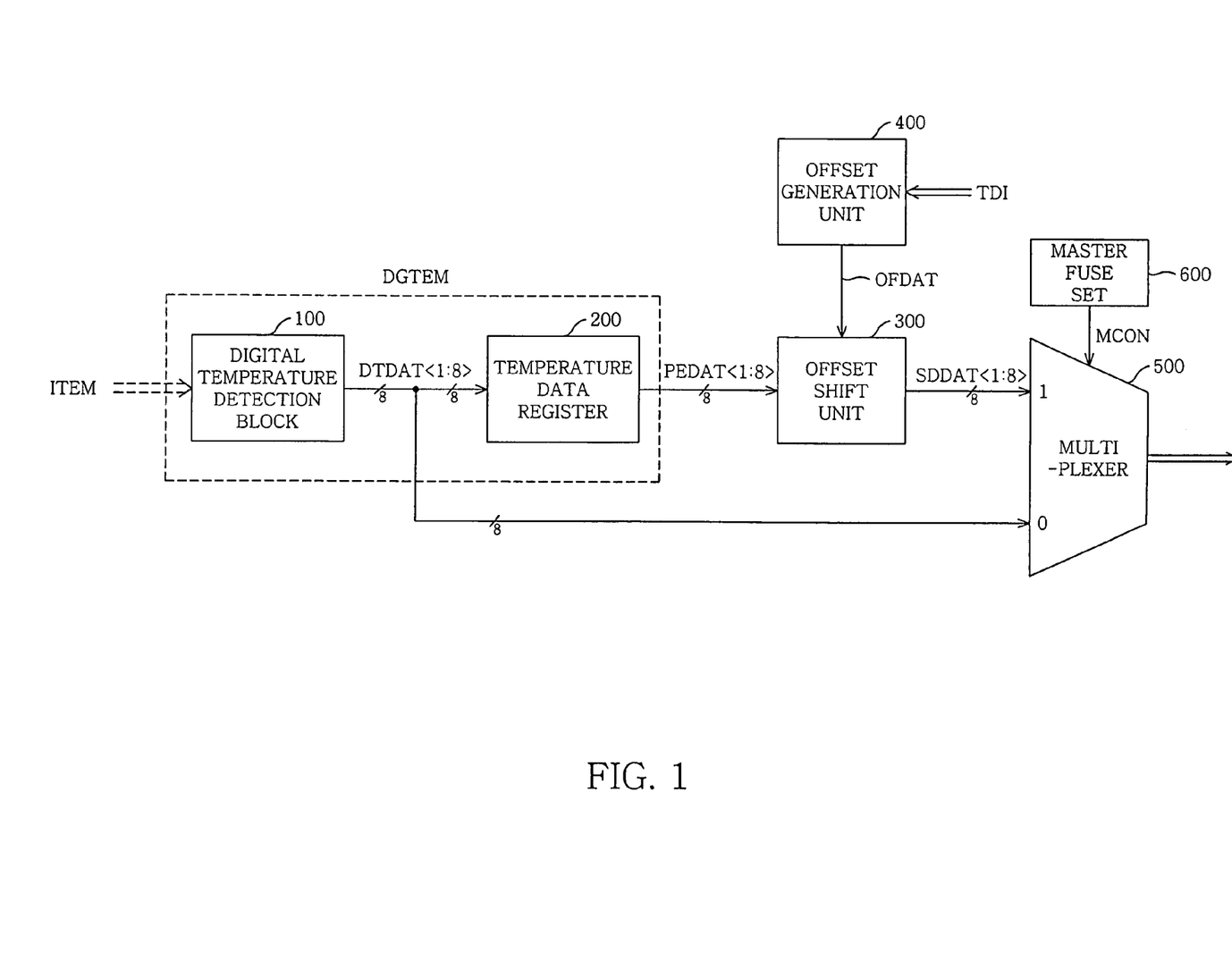
FIG. 1 is a block diagram schematically illustrating a digital temperature detection circuit adapted for use with a semiconductor device in accordance with an embodiment of the invention.

FIG. 1 is a block diagram schematically illustrating a digital temperature detection circuit adapted for use with a semiconductor device in accordance with an embodiment of the invention. Referring to FIG. 1, a digital temperature detection circuit in accordance with an embodiment of the invention comprises a digital temperature generation unit DGTEM, an offset shift unit 300, and an offset generation unit 400.

Digital temperature generation unit DGTEM detects the internal temperature ITEM of a semiconductor device, and generates perception data PEDAT<1:8> in accordance with a pre-set (i.e., predetermined) perception data code. The perception data code comprises a set of data values, wherein the data values correspond to input values and the correlation between the data values and the input values has been set previously. Additionally, the input values correspond to possible values for the internal temperature ITEM, wherein "possible values" for the internal temperature ITEM are temperature values that are possible internal temperatures ITEM for the semiconductor device. In the illustrated embodiment of FIG. 1, the perception data code is a digital code that has a response interval of 1 data value with respect to a temperature variation of 1° C. As used herein, a response interval of 1 data code with respect to a temperature variation of 1° C. means that, for example, input values corresponding to two different detected internal temperatures ITEM that differ by 1° C. or more will correspond to two different data values in the perception data code. Furthermore, perception data PEDAT<1:8>, which comprises a data value of the perception data code, comprises 8 bits of data.

Digital temperature generation unit DGTEM preferably comprises a digital temperature detection block 100 and a temperature data register 200.

Digital temperature detection block 100 detects internal temperature ITEM of the semiconductor device and generates detection data DTDAT<1:8> in accordance with a pre-set (i.e., predetermined) detection data code. The detection data code comprises a set of data values, wherein the data values correspond to input values and the correlation between the data values and the input values has been set previously. Additionally, the input values correspond to possible values for the internal temperature ITEM. In the illustrated embodiment of FIG. 1, detection data DTDAT<1:8>, which comprises a data value of the detection data code, comprises 8 bits of data.

Temperature data register 200 generates perception data PEDAT<1:8> in accordance with the perception data code. In addition, perception data PEDAT<1:8> corresponds to detection data DTDAT<1:8>.

Figure 2:
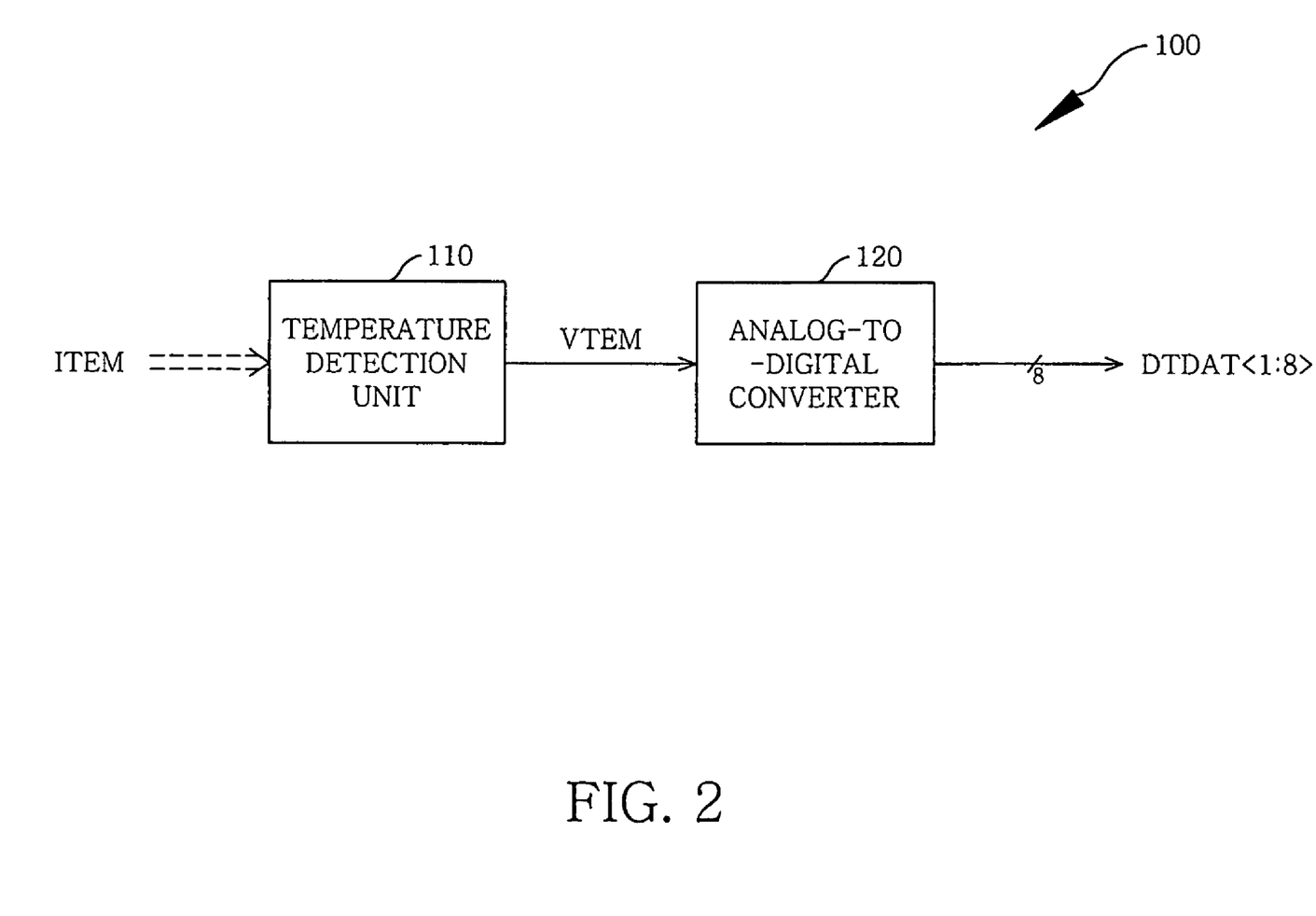
FIG. 2 is a diagram illustrating a digital temperature detection block of the digital temperature detection circuit of FIG. 1 in more detail.

FIG. 2 is a diagram illustrating digital temperature detection block 100 of FIG. 1 in more detail. Referring to FIG. 2, digital temperature detection block 100 comprises a temperature detection unit 110 and an analog-to-digital converter 120. Temperature detection unit 110 detects internal temperature ITEM of the semiconductor device and generates a temperature detection signal VTEM. The voltage level of temperature detection signal VTEM varies in response to variations in internal temperature ITEM of the semiconductor device. For example, the voltage level of temperature detection signal VTEM increases as internal temperature ITEM of the semiconductor device increases.

Analog-to-digital converter 120 converts the voltage level of temperature detection signal VTEM into detection data DTDAT<1:8>, wherein detection data DTDAT<1:8> comprises a data value that corresponds to the voltage level of temperature detection signal VTEM.

Analog-to-digital converter 120 preferably uses a Successive Approximation Register (SAR) method to convert the voltage level of temperature detection signal VTEM, which is an analog data value, into detection data DTDAT<1:8>, which is a digital data value.

Referring again to FIG. 1, offset shift unit 300 shifts perception data PEDAT<1:8> in accordance with offset data OFDTA, generating standard data SDDAT<1:8> (i.e., generating a data value) in accordance with a standard data code. Standard data SDDAT<1:8> comprises a data value of the standard data code.

Figure 3:
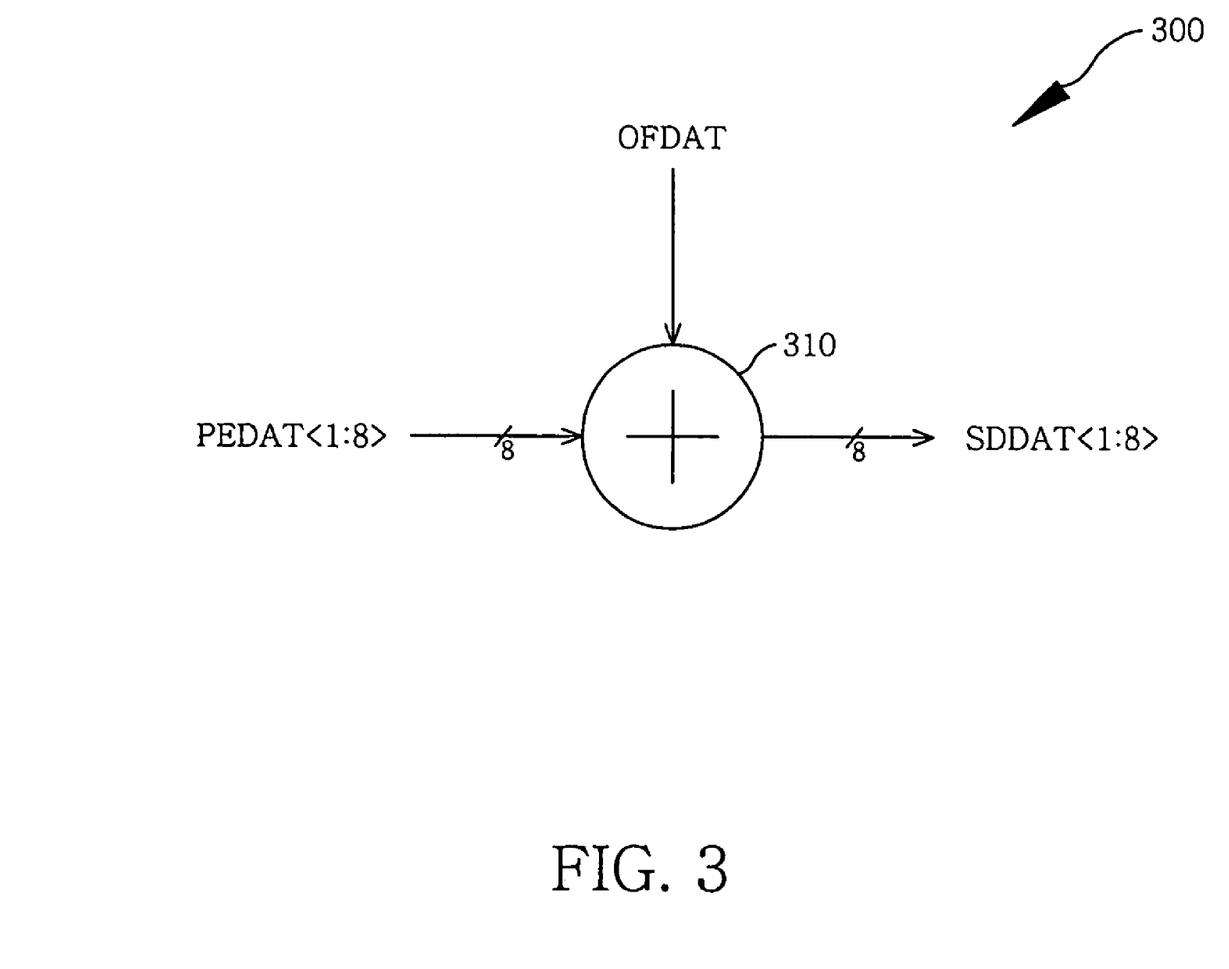
FIG. 3 is a diagram illustrating an offset shift unit of the digital temperature detection circuit of FIG. 1 in more detail.

FIG. 3 is a diagram illustrating offset shift unit 300 of FIG. 1 in more detail. Referring to FIG. 3, offset shift unit 300 comprises an adder 310. Adder 310 adds perception data PEDAT<1:8> to offset data OFDAT and outputs standard data SDDAT<1:8>.

Referring again to FIG. 1, offset generation unit 400 generates offset data OFDAT and is controlled from outside of the digital temperature detection circuit of FIG. 1.

Figure 4:
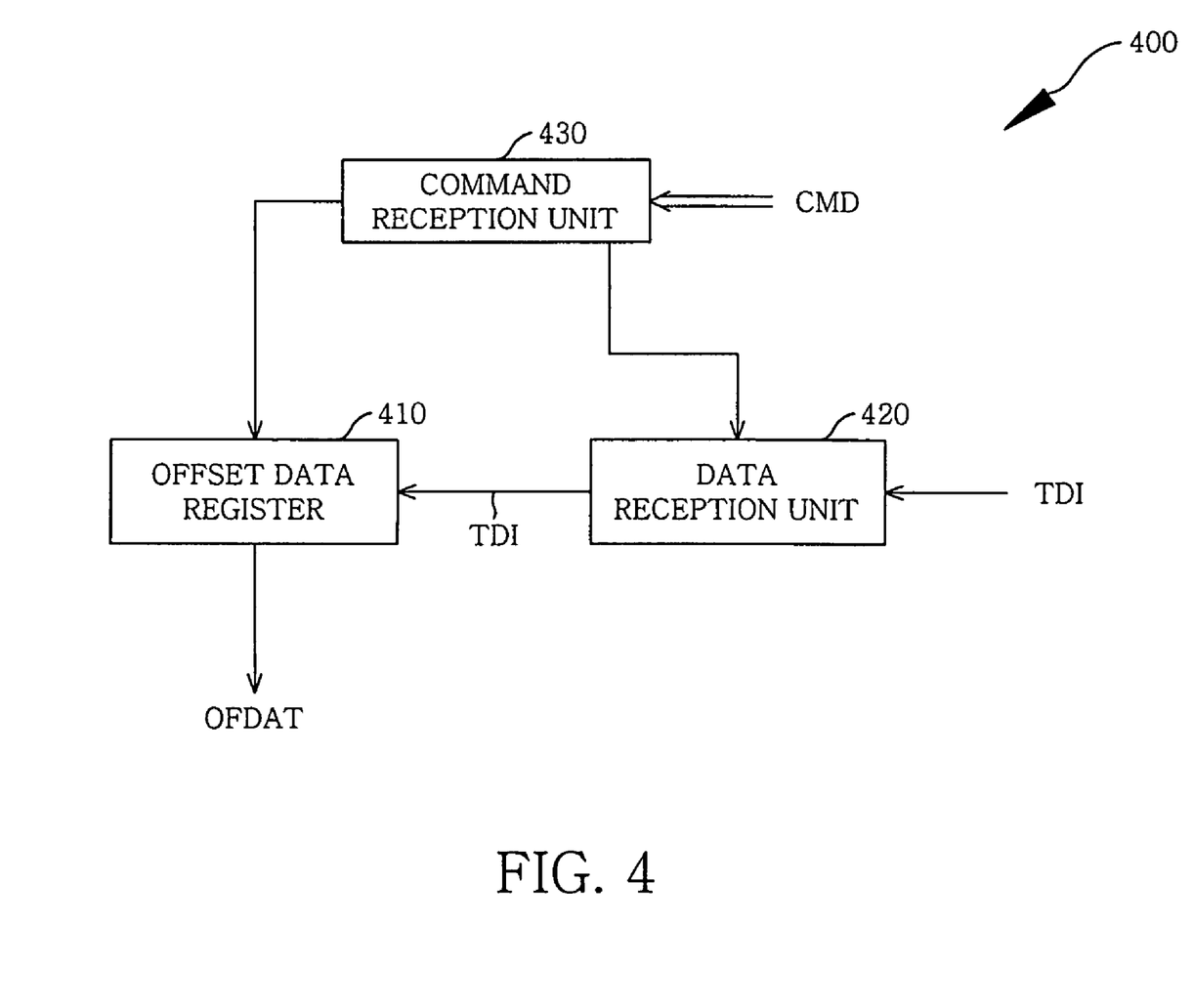
FIG. 4 is a diagram illustrating an offset generation unit of the digital temperature detection circuit of FIG. 1 in more detail.

FIG. 4 is a diagram illustrating offset generation unit 400 of FIG. 1 in more detail. Referring to FIG. 4, offset generation unit 400 comprises an offset data register 410, a data reception unit 420, and a command reception unit 430.

Offset data register 410 stores offset data OFDAT. In addition, offset data register 410 generates offset data OFDAT in accordance with offset input data TDI, which is received by offset generation unit 400 from outside of the digital temperature detection circuit of FIG. 1. Therefore, offset data OFDAT can be readily controlled from outside of the digital temperature detection circuit of FIG. 1.

Data reception unit 420 receives offset input data TDI and provides offset input data TDI to offset data register 410.

In addition, command reception unit 430 receives an external command CMD and controls offset data register 410 and data reception unit 420.

Referring again to FIG. 1, the digital temperature detection circuit of FIG. 1 further comprises a multiplexer 500. Multiplexer 500 selectively outputs either detection data DTDAT<1:8> or standard data SDDAT<1:8> in response to a multiplexer control signal MCON. In the illustrated embodiment of FIG. 1, when the logic state of multiplexer control signal MCON is "L", multiplexer 500 outputs detection data DTDAT<1:8>. Furthermore, when the logic state of multiplexer control signal MCON is "H", multiplexer 500 outputs standard data SDDAT<1:8>.

The digital temperature detection circuit of FIG. 1, in accordance with an embodiment of the invention, further comprises a master fuse set 600 adapted to generate multiplexer control signal MCON. In the illustrated embodiment of FIG. 1, the logic state of multiplexer control signal MCON is set to "H" or "L" in accordance with whether or not a fuse (not shown) embedded in master fuse set 600 has blown (i.e., has been cut off).

Furthermore, in another embodiment, multiplexer control signal MCON may be provided from an MRS (Mode Register Set, not shown). When multiplexer control signal MCON is provided from an MRS, the logic state of the multiplexer control signal MCON can be controlled from outside of the digital temperature detection circuit of FIG. 1.

In the digital temperature detection circuit of FIG. 1, offset data OFDAT can be readily adjusted by inputting offset input data TDI. Furthermore, a semiconductor device using a digital temperature detection circuit in accordance with an embodiment of the invention has various applications because offset data OFDAT may be readily varied even after the semiconductor device has been packaged.

Figure 5:
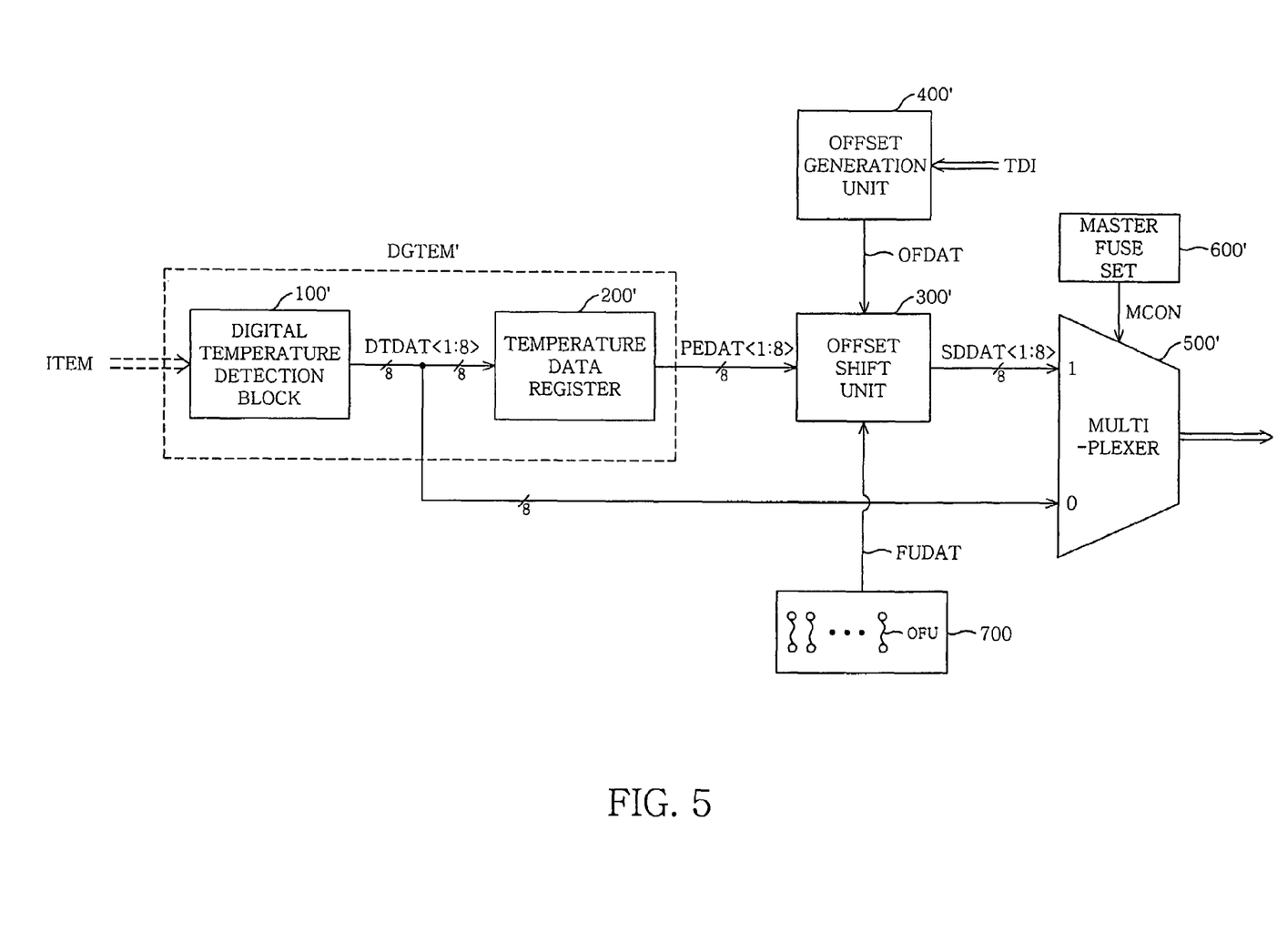
FIG. 5 is a block diagram schematically illustrating a digital temperature detection circuit adapted for use with a semiconductor device in accordance with another embodiment of the invention; and, FIG. 6 is a diagram illustrating an offset shift unit of the digital temperature detection circuit of FIG. 5 in more detail.

FIG. 5 is a block diagram schematically illustrating a digital temperature detection circuit adapted for use with a semiconductor device in accordance with another embodiment of the invention. Like the digital temperature generation circuit of FIG. 1, the digital temperature detection circuit of FIG. 5 comprises a digital temperature generation unit DGTEM', an offset shift unit 300', an offset generation unit 400', a multiplexer 500', and a master fuse set 600'. In addition (i.e., unlike the digital temperature generation circuit of FIG. 1), the digital temperature detection circuit of FIG. 5 further comprises an offset fuse set 700. Digital temperature generation unit DGTEM', offset generation unit 400', multiplexer 500', and master fuse set 600' of the digital temperature detection circuit of FIG. 5 are similar to digital temperature generation unit DGTEM, offset generation unit 400, multiplexer 500, and master fuse set 600 of the digital temperature detection circuit of FIG. 1, respectively. Therefore, detailed descriptions of digital temperature generation unit DGTEM', offset generation unit 400', multiplexer 500', and master fuse set 600' are omitted here. Offset fuse set 700 generates fuse data FUDAT in accordance with whether or not component offset fuses OFU have blown (i.e., have been cut off).

Component offset fuses OFU are preferably electrical fuses, and whether or not a component offset fuse OFU has blown is preferably determined in accordance with the difference between voltages applied to the respective ends of the component offset fuse OFU.

Figure 6:
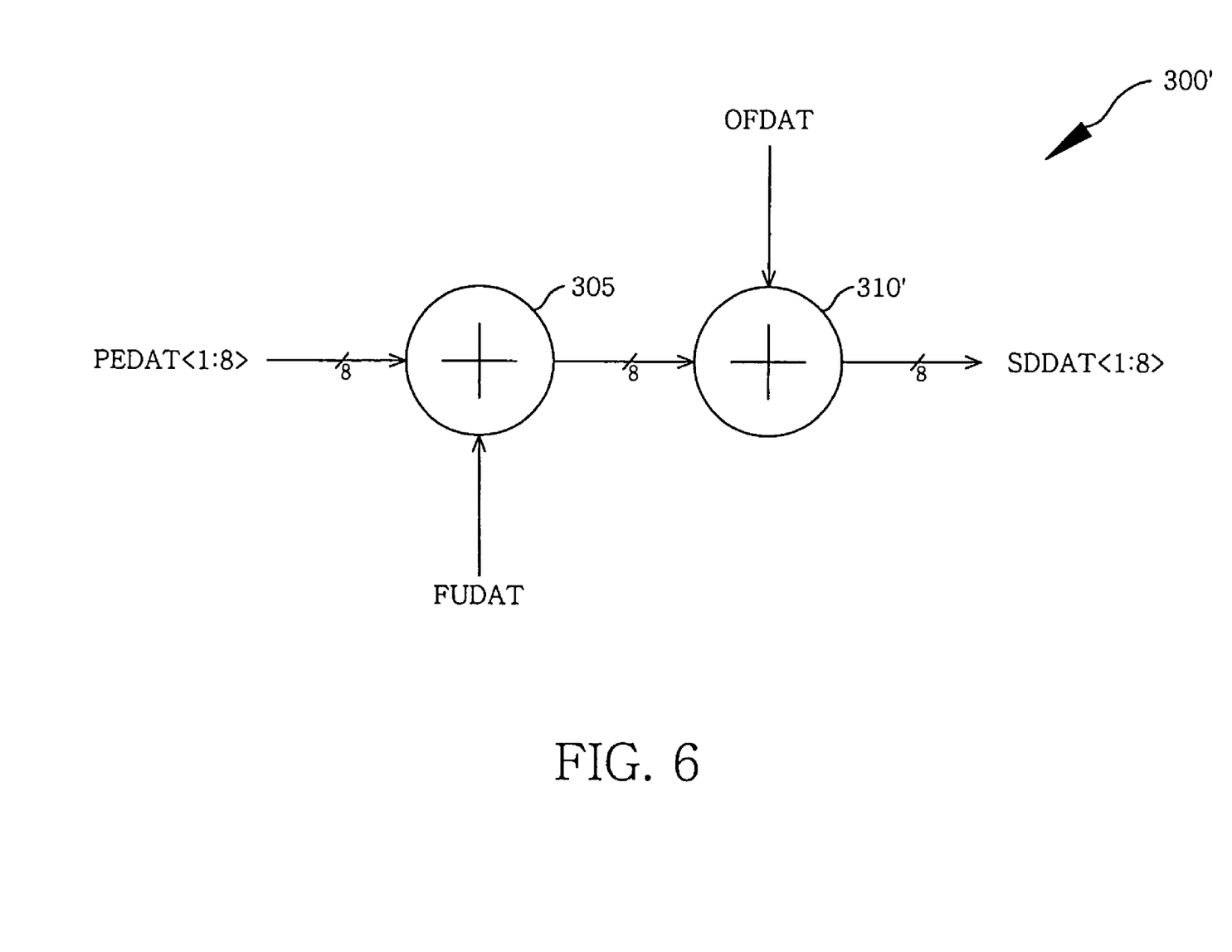

FIG. 6 is a diagram illustrating offset shift unit 300' of FIG. 5 in more detail. Referring to FIG. 6, offset shift unit 300' comprises a first adder 305 and a second adder 310'.

First adder 305 adds perception data PEDAT<1:8> to fuse data FUDAT. Furthermore, second adder 310' adds the data output by first adder 305 to offset data OFDAT and generates standard data SDDAT<1:8>.

In a digital temperature detection circuit in accordance with an embodiment of the invention, offset data OFDAT is readily adjusted by inputting offset input data TDI. Furthermore, a semiconductor device using the digital temperature detection circuit in accordance with an embodiment of the invention has various applications because the offset data may be varied readily even after the semiconductor device has been packaged.

Although embodiments of the invention have been described, various modifications, additions, and substitutions may be made to the embodiments by one of ordinary skill in the art without departing from the scope of the invention as defined by the accompanying claims.

What is claimed is:

1. A digital temperature detection circuit adapted for use with a semiconductor device comprising:

a digital temperature generation unit adapted to detect an internal temperature of the semiconductor device, generate digital detection data, convert the digital detection data into perception data in accordance with a perception data code, and output the perception data;

an offset shift unit adapted to shift the perception data in accordance with offset data to thereby generate standard data;

an offset generation unit adapted to store the offset data in order to generate the offset data corresponding to offset input data, wherein the offset generation unit is externally controlled;

a multiplexer adapted to output the perception data or the standard data in response to a multiplexer control signal; and a master fuse set adapted to generate the multiplexer control signal and provide the multiplexer control signal to the multiplexer.

2. The circuit of claim 1, wherein the master fuse set defines the logic state of the multiplexer control signal in accordance with whether a fuse in the master fuse set has blown.

3. The circuit of claim 1, wherein the perception data is a data value comprising the perception data code, and the standard data is a data value comprising a standard data code.

4. The circuit of claim 3, wherein the perception data is a digital code having a response interval of one data value with respect to a temperature variation of 1° C.

5. The circuit of claim 3, wherein the offset shift unit comprises:

an adder adapted to add the perception data to the offset data.

6. The circuit of claim 3, wherein the digital temperature generation unit comprises:

a digital temperature detection block adapted to detect the internal temperature of the semiconductor device and generate detection data in accordance with a detection data code, wherein the detection data code comprises a set of data values, the data values correspond to input values, and the input values correspond to possible values for the internal temperature of the semiconductor device; and, a temperature data register adapted to generate the perception data in accordance with the detection data and the perception data code.

7. The circuit of claim 3, wherein the offset generation unit comprises:
an offset data register adapted to generate the offset data in accordance with the offset input data.

8. The circuit of claim 7, wherein the offset generation unit further comprises:
a data reception unit adapted to receive the offset input data and provide the offset input data to the offset data register.

9. The circuit of claim 8, wherein the offset generation unit further comprises:
a command reception unit adapted to receive external commands and control the offset data register and the data reception unit.

10. A digital temperature detection circuit adapted for use with a semiconductor device comprising:
a digital temperature generation unit adapted to detect an internal temperature of the semiconductor device, convert the internal temperature into perception data in accordance with a perception data code, and output the perception data;
an offset shift unit adapted to shift the perception data in accordance with offset data and fuse data to thereby generate standard data;
an offset generation unit adapted to generate the offset data, wherein the offset generation unit is externally controlled; and,
an offset fuse set comprising at least one component offset fuse and adapted to generate fuse data in accordance with the conductive state of the at least one component offset fuse.

11. The circuit of claim 10, wherein the perception data is a data value comprising the perception data code, and the standard data is a data value comprising a standard data code.

12. The circuit of claim 11, wherein the perception data is a digital code having a response interval of one data value with respect to a temperature variation of 1° C.

13. The circuit of claim 11, wherein the offset shift unit comprises:
a first adder adapted to add the perception data to the fuse data and output first resultant data; and,
a second adder adapted to add the first resultant data to the offset data.

14. The circuit of claim 11, wherein each one of the at least one component offset fuse is an electric fuse, and the conductive state for the at least one component offset fuse is determined in accordance with a difference between voltages applied to respective ends of the at least one component offset fuse.

15. The circuit of claim 11, wherein the digital temperature generation unit comprises:
a digital temperature detection block adapted to detect the internal temperature of the semiconductor device and generate detection data in accordance with a detection data code, wherein the detection data code comprises a set of data values, the data values correspond to input values, and the input values correspond to possible values for the internal temperature of the semiconductor device; and,
a temperature data register adapted to generate the perception data in accordance with the detection data and the perception data code.

16. The circuit of claim 11, wherein the offset generation unit comprises:
an offset data register adapted to generate the offset data in accordance with offset input data.

17. The circuit of claim 16, wherein the offset generation unit further comprises:
a data reception unit adapted to receive the offset input data and provide the offset input data to the offset data register.

18. The circuit of claim 17, wherein the offset generation unit further comprises:
a command reception unit adapted to receive external commands and control the offset data register and the data reception unit.

* * * * *